US011373463B2

(12) United States Patent
Abuelsaad et al.

(10) Patent No.: US 11,373,463 B2
(45) Date of Patent: Jun. 28, 2022

(54) CAPTURING VEHICLE FLUID CHANGE HISTORY

(71) Applicant: KYNDRYL, INC., New York, NY (US)

(72) Inventors: Tamer E. Abuelsaad, Yorktown, NY (US); Gregory J. Boss, Saginaw, MI (US); John E. Moore, Jr., Pflugerville, TX (US); Randy A. Rendahl, Raleigh, NC (US)

(73) Assignee: KYNDRYL, INC., New York, NY (US)

( * ) Notice: Subject to any disclaimer, the term of this patent is extended or adjusted under 35 U.S.C. 154(b) by 275 days.

(21) Appl. No.: 16/573,062

(22) Filed: Sep. 17, 2019

(65) Prior Publication Data

US 2020/0013240 A1    Jan. 9, 2020

Related U.S. Application Data

(63) Continuation of application No. 15/496,221, filed on Apr. 25, 2017, now Pat. No. 10,573,094.

(51) Int. Cl.
| | |
|---|---|
| *G07C 5/00* | (2006.01) |
| *G07C 5/08* | (2006.01) |
| *F01M 11/12* | (2006.01) |
| *F01M 11/10* | (2006.01) |
| *F01M 11/04* | (2006.01) |

(52) U.S. Cl.
CPC ............ *G07C 5/008* (2013.01); *F01M 11/12* (2013.01); *G07C 5/0858* (2013.01); *F01M 2011/0491* (2013.01); *F01M 2011/14* (2013.01); *F16N 2260/18* (2013.01)

(58) Field of Classification Search
None
See application file for complete search history.

(56) References Cited

U.S. PATENT DOCUMENTS

| | | | |
|---|---|---|---|
| 5,274,335 A | 12/1993 | Wang et al. | |
| 5,377,531 A * | 1/1995 | Gomm | G01N 11/12 340/457.4 |
| 5,517,427 A | 5/1996 | Joyce | |

(Continued)

OTHER PUBLICATIONS

Notice of Allowance dated Oct. 22, 2019 in related U.S. Appl. No. 15/496,221, 5 pages.

(Continued)

*Primary Examiner* — Tamara L Weber
(74) *Attorney, Agent, or Firm* — Erik Swanson; Andrew M. Calderon; Roberts Calderon Safran & Cole P.C.

(57) ABSTRACT

Systems and methods for capturing fluid change history in a vehicle are provided. A method includes: detecting, by a computer device, a fill cap is removed from an inlet port of a fluid reservoir or a drain plug is removed from an outlet port of the fluid reservoir; activating, by the computer device and based on the detecting, one of a fill sensor and a drain sensor; obtaining, by the computer device, fluid characteristics data from one of the fill sensor and the drain sensor; determining, by the computer device, at least one fluid parameter based on the fluid characteristics data; and transmitting, by the computer device, the determined at least one fluid parameter to a remote system via a communication network that is external to the vehicle.

20 Claims, 5 Drawing Sheets

(56) References Cited

U.S. PATENT DOCUMENTS

| | | | |
|---|---|---|---|
| 5,604,441 | A | 2/1997 | Freese, V et al. |
| 5,787,372 | A | 7/1998 | Edwards et al. |
| 7,391,225 | B1 | 6/2008 | Lee et al. |
| 7,900,507 | B2 * | 3/2011 | Kauffman ............ G01M 15/042 73/114.55 |
| 8,179,242 | B2 | 5/2012 | Schneider |
| 8,746,408 | B2 | 6/2014 | Albertson et al. |
| 9,058,706 | B2 | 6/2015 | Cheng |
| 9,311,352 | B2 | 4/2016 | Zeinfeld |
| 9,388,716 | B2 | 7/2016 | Smolenski et al. |
| 2002/0112529 | A1 | 8/2002 | Bondarowicz et al. |
| 2008/0086349 | A1 | 4/2008 | Petrie |
| 2010/0114417 | A1 | 5/2010 | Boss et al. |
| 2011/0041796 | A1 | 2/2011 | Sachdev et al. |
| 2012/0046920 | A1 | 2/2012 | Blossfeld et al. |
| 2012/0119897 | A1 | 5/2012 | Oh et al. |
| 2013/0000392 | A1 | 1/2013 | Lopez et al. |
| 2015/0082872 | A1 | 3/2015 | Von Herzen et al. |
| 2015/0292372 | A1 | 10/2015 | Barnes et al. |
| 2016/0210793 | A1 | 7/2016 | Staley et al. |
| 2017/0221284 | A1 | 8/2017 | Helm |
| 2018/0052025 | A1 | 2/2018 | Gao et al. |
| 2018/0308294 | A1 | 10/2018 | Abuelsaad et al. |
| 2018/0319375 | A1 | 11/2018 | Weigle |

OTHER PUBLICATIONS

Dhall et al., "An IoT Based Predictive Connected Car Maintenance Approach", International Journal of Interactive Multimedia and Artificial Intelligence, Mar. 2017, vol. 4, Issue 3, p. 16-22 (Year: 2017).

Basu et al., "Smart sensing" of Oil Degradation and Oil Level Measurements in Gasoline Engines, SAE Technical Paper Series, No. 2000-01-1366, 2000, 9 pages.

Jakoby et la., "A Novel Multifunctional Oil Condition Sensor", Advanced Microsystems for Automotive Applications 2001, p. 157-165, 2001, 9 pages.

Jakoby et la., "An Automotive Engine Oil Viscosity Sensor", IEEE Sensors Journal, vol. 3, No. 5, Oct. 2003, p. 562-568, 7 pages.

Agoston et al., "An IR-Absorption Sensor System for the Determination of Engine Oil Deterioration", IEEE, 2004, p. 463-466, 4 pages.

Atkins et al., "A Cloud Service For End-user Participation Concerning The Internet Of Things", 2013 International Conference on Signal-Image Technology & Internet-Based Systems, 2013, p. 273-278, 6 pages.

Byington et al., "Advances in Real Time Oil Analysis", http://www.machinerylubrication.com/Read/138/real-time-oil-analysis, Machinery Lubrication, Accessed Apr. 24, 2017, 5 pages.

Reed, "Oil Life Monitoring Systems", https://www.edmunds.com/car-care/oil-life-monitoring-systems.html, edmunds, Aug. 24, 2010, 2 pages.

Integrated Oil Condition Monitor and Debris Sensing System, https://www.sbir.gov/sbirsearch/detail/401663, SBIR STTR, Department of Defense, 2013, 2 pages.

Carey, "The Dielectric Constant of Lubrication Oil", Computational System Incorporated, 1998, 9 pages.

Fluid Property Sensor, FPS2800B12C4, Sensor Solutions, Sep. 2015, 5 pages.

Robinson, Monitoring Oil Degradation With Infrared Spectroscopy, http://machinerylubrication.com/Articles/Print/1109, Accessed Mar. 26, 2017, 7 pages.

Wooton et al., "Using Infrared Spectroscopy in Used Engine Oils Estimating Base Number", http://machinerylubrication.com/Articles/Print/808, Accessed Mar. 26, 2017, 5 pages.

Guide to Measuring Water in Oil, Spectra Scientific, Accessed Mar. 26, 2017, 5 pages.

Oil and Fuel Monitoring Using the ViSmart Viscosity Sensor, http://www.machinerylubrication.com/Articles/Print/2071, SenGenuity, Accessed Mar. 26, 2017, 8 pages.

The Next Frontier: Realtime Dashboard Oil Viscosity, http://machinerylubrication.com/Articles/Print/331, Accessed Mar. 26, 2017, 3 pages.

List of IBM Patents or Patent Applications Treated as Related dated Sep. 17, 2019, 1 page.

* cited by examiner

CAPTURING VEHICLE FLUID CHANGE HISTORY

BACKGROUND

The present invention generally relates to computer-based systems and methods for maintaining vehicle records and, more particularly, to automated systems and methods for automatically capturing and maintaining vehicle fluid change records.

Buying a used car is a trying and unpredictable experience for many people. This is in part because there is a great deal of uncertainty about a vehicle's history. One of the most fundamental indicators of a vehicle history is the fluid history, such as the history oil changes in the vehicle. Maintenance records, including the fluid history, are often manually kept and unreliable.

SUMMARY

In a first aspect of the invention, there is a method for capturing fluid change history in a vehicle. The method includes: detecting, by a computer device, a fill cap is removed from an inlet port of a fluid reservoir or a drain plug is removed from an outlet port of the fluid reservoir; activating, by the computer device and based on the detecting, one of a fill sensor and a drain sensor; obtaining, by the computer device, fluid characteristics data from one of the fill sensor and the drain sensor; determining, by the computer device, at least one fluid parameter based on the fluid characteristics data; and transmitting, by the computer device, the determined at least one fluid parameter to a remote system via a communication network that is external to the vehicle.

In another aspect of the invention, there is a computer program product for capturing fluid change history in a vehicle, the computer program product including a computer readable storage medium having program instructions embodied therewith. The program instructions are executable by a computer device to cause the computer device to: receive fluid event data via network communication from a vehicle, the fluid event data comprising: at least one fluid parameter determined from a fluid that was added to or removed from a fluid reservoir of the vehicle; a vehicle identifier; a timestamp associated with the determining of the at least one fluid parameter; a mileage of the vehicle corresponding to the timestamp; and data defining a type of fluid event as one of a fill event and a drain event; determine a grade of the fluid based on the at least one fluid parameter; and update a vehicle history based on the vehicle identifier and the determined grade of the fluid.

In another aspect of the invention, there is a system for capturing fluid change history in a vehicle. The system includes: a fluid reservoir in the vehicle, the fluid reservoir comprising an inlet port, an outlet port, an internal cavity, an inlet cap, a drain plug, a cap sensor, and a fill sensor; and a sample system installed in the vehicle for collecting samples of fluid from the fluid reservoir, the sample system comprising: a dispenser that is fluidically connected to the internal cavity of the fluid reservoir via plumbing, and a plurality of sample containers each configured to receive one of the sample of fluids from the dispenser.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
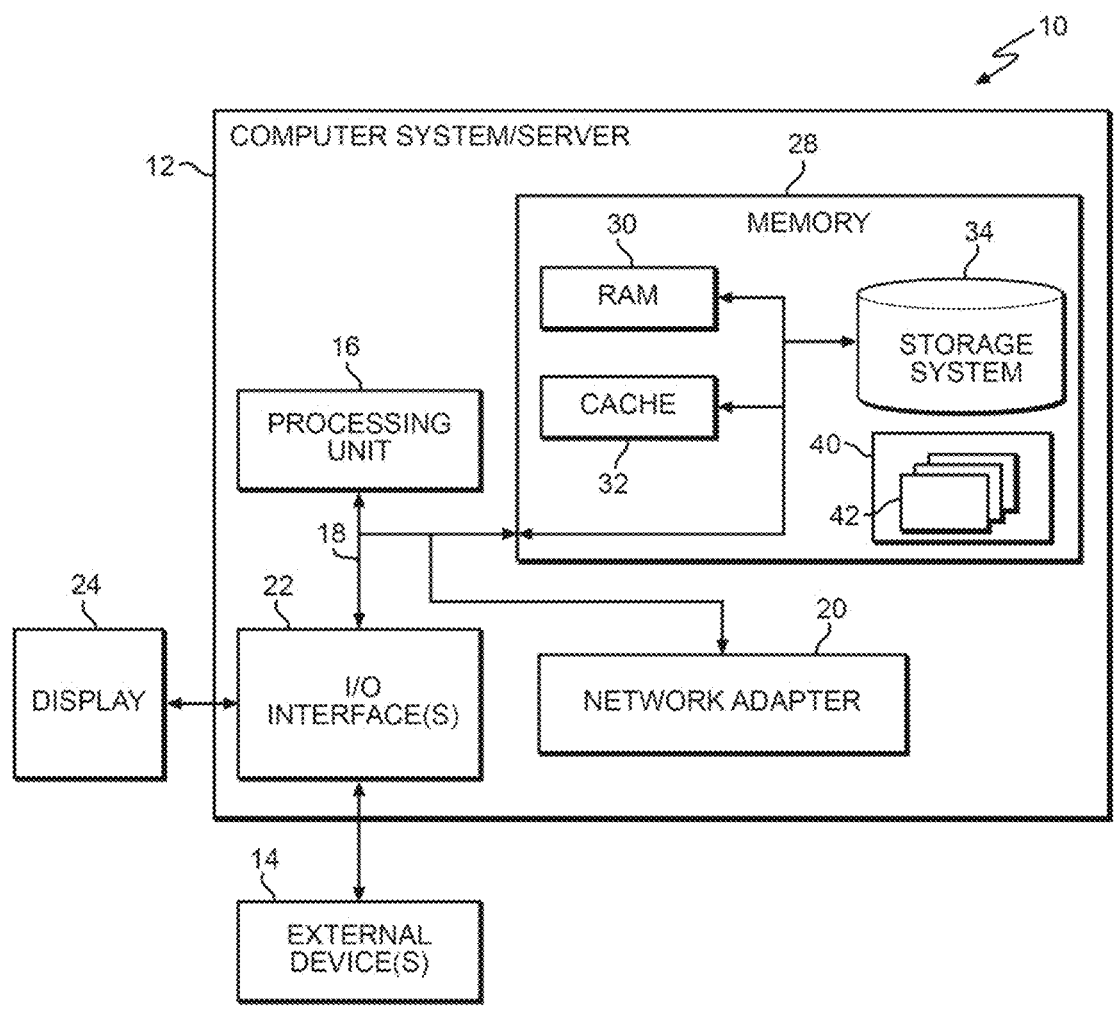
FIG. 1 depicts a computing infrastructure according to an embodiment of the present invention.

The present invention generally relates to computer-based systems and methods for maintaining vehicle records and, more particularly, to automated systems and methods for automatically capturing and maintaining vehicle fluid change records. Aspects of the invention recognize that maintenance records, including the fluid change history of a vehicle, are often manually kept and unreliable. Moreover, even reliable records of frequency and timeliness of fluid changes are not an optimal indicator of a vehicle's history. Instead, the actual fluid quality at both introduction into and removal from the vehicle are more relevant than frequency and timeliness of fluid changes. Accordingly, aspects of the invention automatically determine a quality of fluid that is added to and removed from a vehicle, and generate an auditable record of this data for the vehicle over its lifetime.

In accordance with an embodiment of the invention, a vehicle is equipped with a system that automatically detects when a fluid is added to or removed from the vehicle. For example, the system may be configured to detect when oil is added to or removed from the vehicle, e.g., during an oil change. Based on the automatic detection, the system performs an in-situ analysis of the fluid that is added to or removed from the vehicle, and the results of the analysis are automatically stored in a data record associated with the vehicle. The data record can be maintained by an independent service provider that is not a party to the ownership and/or sale of the vehicle. In this manner, a record of the vehicle's fluid history is automatically generated without manual input of data from the owner (or seller) of the vehicle, such that an individual wishing to purchase the vehicle may reliably determine the vehicle's fluid history by accessing the data record, e.g., from the independent service provider.

In accordance with another embodiment of the invention, a vehicle is equipped with a system that automatically captures and retains a sample of fluid each time the fluid is changed in the vehicle. In aspects, the system includes plural containers for storing plural different fluid samples, and is configured to obtain and store a sample of the fluid from the vehicle in one of the containers during each fluid change event. For example, at each oil change, a sample of the oil is obtained and stored in one of the containers. In this manner, a potential buyer of the vehicle may have each of the samples analyzed to know what type of oil was used at each oil change.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
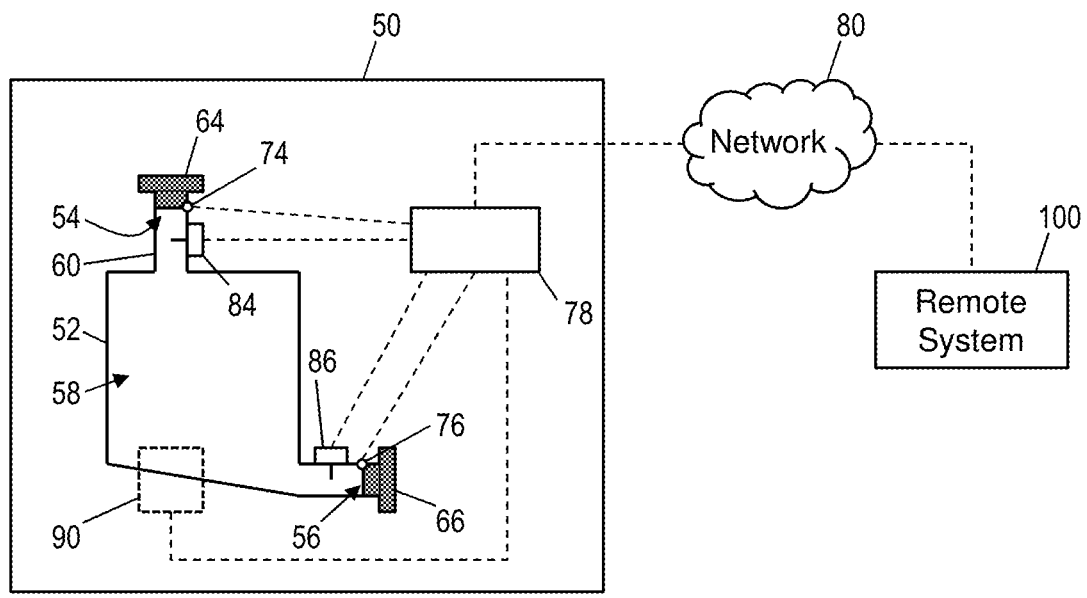
FIGS. 2 and 3 show a block diagram of a system in accordance with aspects of the invention.

FIG. 2 shows a block diagram of a system in accordance with aspects of the invention. As shown in FIG. 2, the system includes a vehicle 50 which may be, for example, an automobile, truck, sport utility vehicle, motorcycle, etc. The vehicle 50 includes a fluid reservoir 52 that holds a fluid that is used by the vehicle. The fluid reservoir 52 may comprise, but is not limited to, an engine oil reservoir, a transmission fluid reservoir, and a brake fluid reservoir. Aspects of the invention are described herein with respect to the example of an engine oil reservoir, but implementations of the invention are not limited to use with this particular type of fluid and fluid reservoir.

Figure 3:
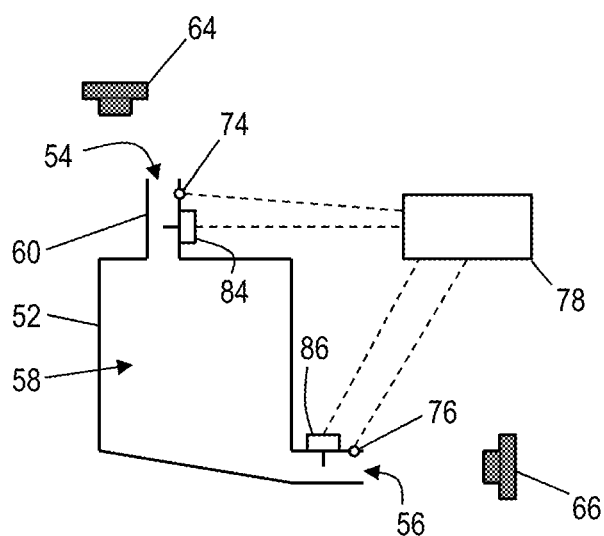

As shown in FIG. 2, the fluid reservoir 52 includes an inlet port 54 and an outlet port 56 each in fluidic communication with an internal cavity (e.g., internal volume) 58 of the fluid reservoir 52. The inlet port 54 may be located at the end of a fill neck 60. As shown in FIGS. 2 and 3, the system includes an inlet cap 64 that can be selectively attached to and removed from the inlet port 54, and a drain plug 66 that can be selectively attached to and removed from the outlet port 56. For example, the inlet cap 64 may be removed from the inlet port 54 when adding fluid to the internal cavity 58 of the fluid reservoir 52. Similarly, the drain plug 66 may be removed from the outlet port 56 when removing (e.g., draining) fluid from the internal cavity 58 of the fluid reservoir 52.

In accordance with aspects of the invention, the system includes a cap sensor 74 that detects the presence (and absence) of the inlet cap 64 in the inlet port 54. The cap sensor 74 can be any suitable type of sensor that detects the presence (and absence) of the inlet cap 64 in the inlet port 54. For example, the cap sensor 74 may comprise a switch that is spring biased to a first position when the inlet cap 64 is not positioned in the inlet port 54, and that is depressed to a second position by the inlet cap 64 when the inlet cap 64 is positioned in the inlet port 54. This type of switch may be configured to emit a first electrical signal when it is in the first position and a second electrical signal (different than the first electrical signal) when it is in the second position. In another example, the cap sensor 74 may include an electrical circuit that is opened by the absence of the inlet cap 64 in the inlet port 54, and that is closed by the presence of the inlet cap 64 in the inlet port 54. This type of sensor may be configured to emit a first electrical signal when the circuit is open and a second electrical signal (different than the first electrical signal) when the circuit is closed. In this manner, the cap sensor 74 is configured to detect when the inlet cap 64 is positioned in the inlet port 54 and when the inlet cap 64 is not positioned in the inlet port 54.

In accordance with aspects of the invention, the system includes a plug sensor 76 that detects the presence (and absence) of the drain plug 66 in the outlet port 56. The plug sensor 76 can be any suitable type of sensor that detects the presence (and absence) of the drain plug 66 in the outlet port 56, including but not limited to the examples described with respect to the cap sensor 74. In this manner, the plug sensor 76 is configured to detect when the drain plug 66 is positioned in the outlet port 56 and when the drain plug 66 is not positioned in the outlet port 56.

As shown in FIG. 2, the vehicle 50 includes a computer device 78 that may be similar to and comprise one or more elements of computer system 12 of FIG. 1. For example, the computer device 78 may include a memory that stores one or more program applications, a processor that runs the one or more program applications, and a communication system for communicating with a network 80 that is external to the vehicle 50. In embodiments, the cap sensor 74 is operatively connected to the computer device 78 such that the computer device 78 can determine the presence (and absence) of the inlet cap 64 in the inlet port 54 based on a signal from the cap sensor 74. The plug sensor 76 is also operatively connected to the computer device 78 such that the computer device 78 can determine the presence (and absence) of the drain plug 66 in the outlet port 56 based on a signal from the plug sensor 76.

Still referring to FIGS. 2 and 3, according to aspects of the invention the system includes at least one fill sensor 84 that is configured to detect at least one characteristic of fluid that is added to the fluid reservoir 52 via the inlet port 54, and at least one drain sensor 86 that is configured to detect at least one characteristic of fluid that is removed from the fluid reservoir 52 via the outlet port 56. The at least one fill sensor 84 and the at least one drain sensor 86 are operatively connected to the computer device 78 such that the computer device 78 receives sensor data from the respective sensors.

In accordance with aspects of the invention, the computer device 78, the at least one fill sensor 84, and the at least one drain sensor 86 constitute a fluid detection system that is configured to determine at least one parameter of fluid that is added to the fluid reservoir 52 and at least one parameter of fluid that is removed from the fluid reservoir 52. In embodiments, the sensors 84, 86 are installed onboard the vehicle 50 to measure characteristics of the oil that is added or removed from the fluid reservoir 52, and the computer device 78 is programmed with logic that is configured to directly or indirectly determine at least one parameter of the oil from the measured characteristics.

According to aspects of the invention, the at least one fill sensor 84 is configured to detect one or more characteristics of oil being added to the fluid reservoir 52 when the inlet cap 64 is removed from the reservoir. In embodiments, based on detecting via the cap sensor 74 that the inlet cap 64 is removed from the inlet port 54, the system is configured to activate the at least one fill sensor 84 to detect one or more characteristics of fluid being added to the fluid reservoir 52 via the inlet port 54. For example, a portion of the at least one fill sensor 84 may extend into the fill neck 60, and the at least one fill sensor 84 may be configured to detect at least one of temperature, dynamic viscosity, dielectric constant, and electrochemical reactivity of oil that passes over the portion extending into the fill neck 60 (e.g., as the oil is being poured into the fluid reservoir 52 via the inlet port 54).

The computer device 78 is configured to determine one or more parameters of the input fluid (e.g., oil in this example) based on the data from the at least one fill sensor 84. For example, based on temperature and dynamic viscosity data from the at least one fill sensor 84, the computer device 78 may determine a viscosity of the input oil. In another example, based on dielectric constant data from the at least one fill sensor 84, the computer device 78 may determine whether the input oil is synthetic or non-synthetic oil, e.g., using predefined stored data that defines a correlation of dielectric constant of the oil to synthetic and non-synthetic oil. In another example, based on electrochemical reactivity data from the at least one fill sensor 84, the computer device 78 may determine the presence or absence of detergents in the input oil, e.g., using predefined stored data that defines a correlation of electrochemical reactivity of the oil to the presence or absence of detergents. These described characteristics detected by the at least one fill sensor 84 and the parameters determined from the characteristics are exemplary and not limiting. Implementations of the invention may utilize one or more of the described characteristics and/or other characteristics to determine one or more of the described parameters and/or other parameters of the fluid being added to the fluid reservoir 52.

According to aspects of the invention, the at least one drain sensor 86 is configured to detect one or more characteristic of fluid being removed to the fluid reservoir 52 when the drain plug 66 is removed from the reservoir. In embodiments, based on detecting via the sensor 76 that the drain plug 66 is removed from the outlet port 56, the system is configured to activate the at least one drain sensor 86 to detect one or more characteristics of oil being removed from the fluid reservoir 52 via the outlet port 56. For example, a portion of the at least one drain sensor 86 may extend into the fluid reservoir 52 in a flowpath of oil being drained from the fluid reservoir 52, and the at least one drain sensor 86 may be configured to detect at least one of temperature, density, dynamic viscosity, and dielectric constant, and electrical reactivity of oil that passes over the portion extending into the fluid reservoir 52 (e.g., as the oil is being drained out of the fluid reservoir 52 via the outlet port 56). Based on the data from the at least one drain sensor 86, the computer device 78 may determine parameters of the oil such as: viscosity, presence of water in the oil, presence of fuel in the oil, presence of glycol in the oil, and presence of solvents (e.g., detergents) in the oil. These described characteristics detected by the at least one drain sensor 86 and the parameters determined from the characteristics are exemplary and not limiting. Implementations of the invention may utilize one or more of the described characteristics and/or other characteristics to determine one or more of the described parameters and/or other parameters of the fluid being removed from the fluid reservoir 52.

In another embodiment, characteristics of the fluid in the fluid reservoir 52 are determined using an onboard spectroscopy system 90 instead of, or in addition to, the sensors 84, 86. For example, infrared spectroscopy may be used to measure water, glycol, soot, oxidation/nitration, and fuel levels in oil. In an illustrative example, Fourier transform infrared (FTIR) techniques may compare a spectrum of the oil at a first time (t1) to a spectrum of the oil at a second time (t2) to determine an amount of one or more contaminants in the oil at the second time (t2). Other direct methods may also be used. In this embodiment, the spectroscopy system 90 may be installed onboard the vehicle 50 and plumbed to the fluid reservoir 52, where the spectroscopy system 90 obtains a sample of oil from the fluid reservoir 52 and performs FTIR analysis of the oil sample from the fluid reservoir 52. The spectroscopy system 90 may be operatively connected to the computer device 78 to provide data to the computer device 78. Also, based on detecting the inlet cap 64 being removed, the computer device 78 may instruct the spectroscopy system 90 to obtain a sample of oil from the fluid reservoir 52 and perform FTIR analysis of the oil sample, e.g., to determine characteristics of oil being added to the fluid reservoir 52. Similarly, based on detecting the drain plug 66 being removed, the computer device 78 may instruct the spectroscopy system 90 to obtain a sample of oil from the fluid reservoir 52 and perform FTIR analysis of the oil sample, e.g., to determine characteristics of oil being removed from the fluid reservoir 52.

In accordance with aspects of the invention, the computer device 78 is configured to communicate the determined parameters of the fluid to a remote system 100 via the network 80. As such, in the case of fluid being added to the fluid reservoir 52, the computer device 78 is configured to: determine that the at the inlet cap 64 is removed, cause the at least one fill sensor 84 to detect characteristics of the input fluid, determine one or more parameters of the input fluid from the detected characteristics, and transmit the determined parameters to the remote system 100 using network communication via the network 80. Similarly, in the case of fluid being removed from the fluid reservoir 52, the computer device 78 is configured to: determine that the at the drain plug 66 is removed, cause the at least one drain sensor 86 to detect characteristics of the output fluid, determine one or more parameters of the output fluid from the detected characteristics, and transmit the determined parameters to the remote system 100 using network communication via the network 80.

In both situations (i.e. in both the fill and drain cases), the computer device 78 may transmit additional information to the remote system 100 along with the determined parameters of the fluid. For example, the computer device 78 may transmit at least one of: an identifier of the vehicle (e.g., vehicle identifier number (VIN)); the current mileage of the vehicle (e.g., as indicated at an odometer of the vehicle); a timestamp corresponding to a date and time when the parameters were determined (e.g., as obtained from a clock in the computer device 78); data defining the type of fluid event (e.g., a fill event or a drain event); and other information such as season (e.g., spring, summer, autumn, winter), current weather (e.g., temperature, humidity, etc.), and geographic region (e.g., zip code, GPS coordinates, etc.). The computer device 78 may transmit the data to the remote system 100 using any suitable communication protocol via the network, such as 3G, 4G, LTE, etc.

With continued reference to FIGS. 2 and 3, the remote system 100 may comprise a computer device that is similar to and comprises one or more elements of computer system 12 of FIG. 1. For example, the remote system 100 may include a memory that stores one or more program applications, a processor that runs the one or more program applications, and a communication system for communicating with the network 80. In embodiments, the remote system 100 is at a different geographic location than the vehicle 50. In a preferred embodiment, the remote system 100 is associated with a service provider and receives and stores data like that described herein from plural different vehicles. In this manner, the services of the remote system 100 may be offered to plural owners of plural vehicles as part of a network service, e.g., a cloud service.

In accordance with aspects of the invention, the remote system 100 generates and stores a vehicle history for each vehicle (e.g., vehicle 50 and others) based on the data received from the vehicles (e.g., vehicle identifier, mileage, type of fluid event, determined fluid parameters, etc.). The vehicle history for the vehicle 50 may include data that defines: a date a fluid event occurred; a type of fluid event; mileage of the vehicle at the fluid event; and whether the fluid is a satisfactory grade. The remote system 100 may store data defining the vehicle history for each vehicle in a computer storage system such as a repository or database system.

In accordance with aspects of the invention, based on the determined fluid parameters received from the vehicle 50, the remote system 100 determines a fluid grade and stores a record of the fluid grade in the vehicle history for the vehicle 50. When the fluid event is a fill event (e.g., data from the vehicle 50 indicates that fluid was added to the fluid reservoir 52), the remote system 100 is configured to determine an input fluid grade of the fluid added to the fluid reservoir 52 based on the determined parameters of the fluid (e.g., the parameters reported to the remote system 100 by the vehicle 50). In embodiments, the input fluid grade is one of satisfactory and unsatisfactory. In embodiments, the input fluid grade is satisfactory if each of the determined parameters is within an acceptable predefined range for the respective parameter. In one example the added fluid is oil, the determined parameter is viscosity, and the remote system 100 compares the determined viscosity of the oil to a predefined acceptable range of viscosity. If the determined viscosity is within the predefined acceptable range of viscosity, then the oil is deemed satisfactory grade (e.g., the input fluid grade=satisfactory). If the determined viscosity is not within the predefined acceptable range of viscosity, then the oil is deemed unsatisfactory grade (e.g., the input fluid grade=unsatisfactory).

In another example the added fluid is oil, the determined parameter is whether the oil is synthetic, and the remote system 100 compares the determined parameter to a predefined acceptable range for the parameter. If the determined parameter (e.g., the oil is synthetic) is within the predefined acceptable range for the parameter (e.g., synthetic=yes), then the oil is deemed satisfactory grade. If the determined parameter (e.g., the oil is non-synthetic) is not within the predefined acceptable range for the parameter (e.g., synthetic=yes), then the oil is deemed unsatisfactory grade.

In embodiments, when plural parameters are determined (e.g., viscosity and synthetic), then the remote system 100 deems the input fluid grade as satisfactory when all of the determined parameters are within their predefined acceptable range. Otherwise, if any one of the plural determined parameters is not within its predefined acceptable range, then the input fluid grade is deemed unsatisfactory. The remote system 100 may store the predefined acceptable ranges for any number and type of parameters. The predefined acceptable ranges may be defined, for example, by the manufacturer of the vehicle 50 and may be stored by the remote system 100 in a manner such that the data defining the ranges cannot be adjusted by an individual associated with the vehicle 50. In the example of the fluid being oil, the determined parameters that are used in determining the input fluid grade may include at least one of: viscosity, presence of detergents (e.g., cleaning agents), and whether the oil is synthetic or non-synthetic. However, the invention is not limited to these parameters, and other parameters may be determined and used in determining the input fluid grade.

Similarly, when the fluid event is a removal event (e.g., data from the vehicle 50 indicates that fluid was removed from the fluid reservoir 52), the remote system 100 is configured to determine an output fluid grade of the fluid removed from the fluid reservoir 52 based on the determined parameters of the fluid (e.g., the parameters reported to the remote system 100 by the vehicle 50). In embodiments, the output fluid grade is one of satisfactory and unsatisfactory. In embodiments, and in a manner similar to that described with respect to the input fluid grade, the output fluid grade is satisfactory if each of the determined parameters is within an acceptable predefined range for the respective parameter. Conversely, the output fluid grade is unsatisfactory if any one or more of the determined parameters is not within an acceptable predefined range for the respective parameter. In the example of the fluid being oil, the determined parameters that are used in determining the output fluid grade may include at least one of: viscosity, presence of water in the oil, presence of fuel in the oil, presence of glycol in the oil, and presence of solvents (e.g., detergents) in the oil. However, the invention is not limited to these parameters, and other parameters may be determined and used in determining an output fluid grade.

Alternatively to determining the fluid grade at the remote system 100, the fluid grade may be determined by the computer device 78 onboard the vehicle. In this embodiment, the computer device 78 determines the input fluid grade or the output fluid grade (e.g., using techniques described herein) and transmits the determined fluid grade as part of the data that is communicated to the remote system 100.

Figure 4:
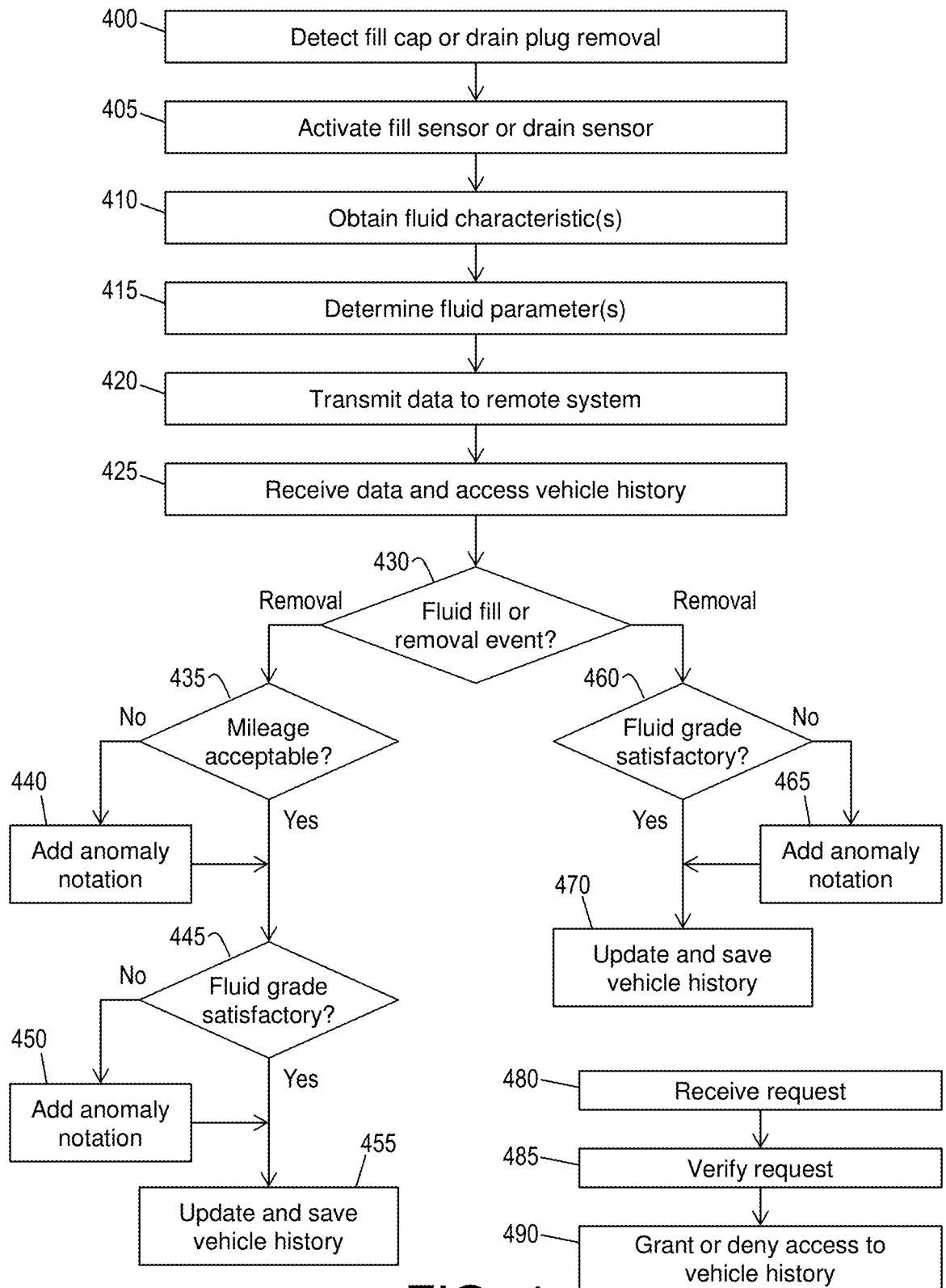
FIG. 4 shows a flowchart of an exemplary method in accordance with aspects of the invention.

FIG. 4 shows a flowchart of a method in accordance with aspects of the invention. Steps of the method of FIG. 4 may be performed in the system illustrated in FIG. 2 and are described with reference to elements and steps described with respect to FIG. 2.

At step 400, the system detects removal of one of the inlet cap 64 and the drain plug 66 from the fluid reservoir of the vehicle 50. In embodiments, as described with respect to FIG. 2, the computer device 78 monitors signals from the cap sensor 74 and the plug sensor 76 to determine when one of the inlet cap 64 and the drain plug 66 is removed.

At step 405, the system activates at least one sensor to detect characteristics of a fluid based on the detection of step 400. In embodiments, as described with respect to FIG. 2, the computer device 78 activates the at least one fill sensor 84 based on detecting at step 400 that the inlet cap 64 is removed. In embodiments, as described with respect to FIG. 2, the computer device 78 activates the at least one drain sensor 86 based on detecting at step 400 that the drain plug 66 is removed.

At step 410, the system obtains at least one characteristic of the fluid being added to or removed from the fluid reservoir 52. In embodiments, as described with respect to FIG. 2, the computer device 78 receives sensor data from the at least one fill sensor 84 or the at least one drain sensor 86.

At step 415, the system determines at least one parameter of the fluid being added to or removed from the fluid reservoir 52. In embodiments, as described with respect to FIG. 2, the computer device 78 determines the at least one parameter based on the at least one characteristic obtained at step 410, e.g., based on the sensor data.

At step 420, the system transmits data from the vehicle to the remote system 100. In embodiments, as described with respect to FIG. 2, the computer device 78 transmits data to the remote system 100 via the network 80, the data comprising: vehicle identifier; timestamp; vehicle mileage; fluid event type indicator (e.g., fill or removal); determined parameter(s) of the fluid; and other information. The transmitting may be performed by the computer device 78 using an application program interface (API) that is unique to the remote system 100.

At step 425, the remote system 100 receives the data from the computer device 78 and accesses the stored vehicle history for the vehicle identified in the data. In embodiments, the remote system 100 uses the vehicle identifier contained in the data to identify the stored vehicle history for the vehicle 50. The receiving may be performed using the application program interface (API) that is unique to the remote system 100.

At step 430, the remote system 100 determines whether the fluid event reported in the data is a fill event or a removal event. In embodiments, the remote system 100 uses the fluid event type indicator contained in the data (i.e., the data transmitted at step 420) to determine whether the fluid event reported in the data is a fill event or a removal event. If the event is a removal event, then the process proceeds to step 435. If the event is a fill event, then the process proceeds to step 460.

At step 435, the remote system 100 determines whether the mileage of the vehicle is acceptable. In embodiments, the remote system 100 compares the mileage contained in the data (i.e., the data transmitted at step 420) to a mileage schedule for the vehicle 50. If the mileage contained in the data is within a predefined range defined by the mileage schedule, then the remote system 100 deems the mileage is acceptable. If the mileage contained in the data is not within a predefined range defined by the mileage schedule, then the remote system 100 deems the mileage is unacceptable. If the mileage is deemed unacceptable, then at step 440 the remote system 100 adds an anomaly notation in the vehicle history that this fluid event occurred at an unacceptable mileage.

At step 445, the remote system 100 determines whether the output fluid grade is acceptable. In embodiments, as described with respect to FIG. 2, the remote system 100 determines an output fluid grade as one of satisfactory and unsatisfactory based on the determined parameter(s) of the fluid defined in the data that was transmitted at step 420. If the output fluid grade is deemed unsatisfactory, then at step 450 the remote system adds an anomaly notation in the vehicle history that the fluid removed during this fluid event has an unsatisfactory grade. The notation may include details of the determined parameter and the predefined acceptable range that the determined parameter failed to satisfy.

At step 455, the remote system 100 updates and saves the vehicle history for the vehicle 50. In embodiments, the remote system 100 saves data in the vehicle history including: the vehicle identifier; the timestamp; the vehicle mileage; the fluid event type indicator (e.g., fill or removal); determined parameter(s) of the fluid; and any anomaly notations from steps 440 and 450.

If at step 430 the remote system determines that the fluid event is a fill event, then at step 460 the remote system 100 determines whether the input fluid grade is acceptable. In embodiments, as described with respect to FIG. 2, the remote system 100 determines an input fluid grade as one of satisfactory and unsatisfactory based on the determined parameter(s) of the fluid defined in the data that was transmitted at step 420. The input fluid grade may also be determined based on at least one of: season (e.g., spring, summer, autumn, winter), current weather (e.g., temperature, humidity, etc.), and geographic region (e.g., zip code, GPS coordinates, etc.), which may be reported to the remote system 100 by the computer device 78 at step 420. If the input fluid grade is deemed unsatisfactory, then at step 465 the remote system adds an anomaly notation in the vehicle history that the fluid added during this fluid event has an unsatisfactory grade. The notation may include details of the determined parameter and the predefined acceptable range that the determined parameter failed to satisfy.

At step 470, the remote system 100 updates and saves the vehicle history for the vehicle 50. In embodiments, the remote system 100 saves data in the vehicle history including: the vehicle identifier; the timestamp; the vehicle mileage; the fluid event type indicator (e.g., fill or removal); determined parameter(s) of the fluid; and any anomaly notations from step 465.

The steps 400-455 (or 400-430 and 460-470) may be repeated each time a fluid fill or removal event occurs at the vehicle 50. In this manner, the remote system 100 may maintain a vehicle history for plural fluid events of the vehicle 50. In this manner, a prospective purchaser of the vehicle 50 may request access to the vehicle history to ascertain information that is useful in the purchasing decision.

In accordance with aspects of the invention, the remote system 100 may control access to the vehicle history for each vehicle, e.g., for vehicle 50 and plural other vehicles. The access control may be connected to a variety of options including, for example, VIN input to access, subscription to all vehicle histories through a subscription service, and a tightly integrated access using a service provided by the vehicle manufacturer. Accordingly, in embodiments, the remote system 100 may be configured to: receive a request for a vehicle history, the request being received from a computer device (e.g., using an API) and including credentials and a vehicle identifier (step 480); verify the request, e.g., by comparing the received credentials to stored credentials saved in association with the vehicle identifier (step 485); and one of grant access to the vehicle history when the received credentials match the stored credentials, and deny access to the vehicle history when the received credentials match the stored credentials (step 490).

Figure 5:
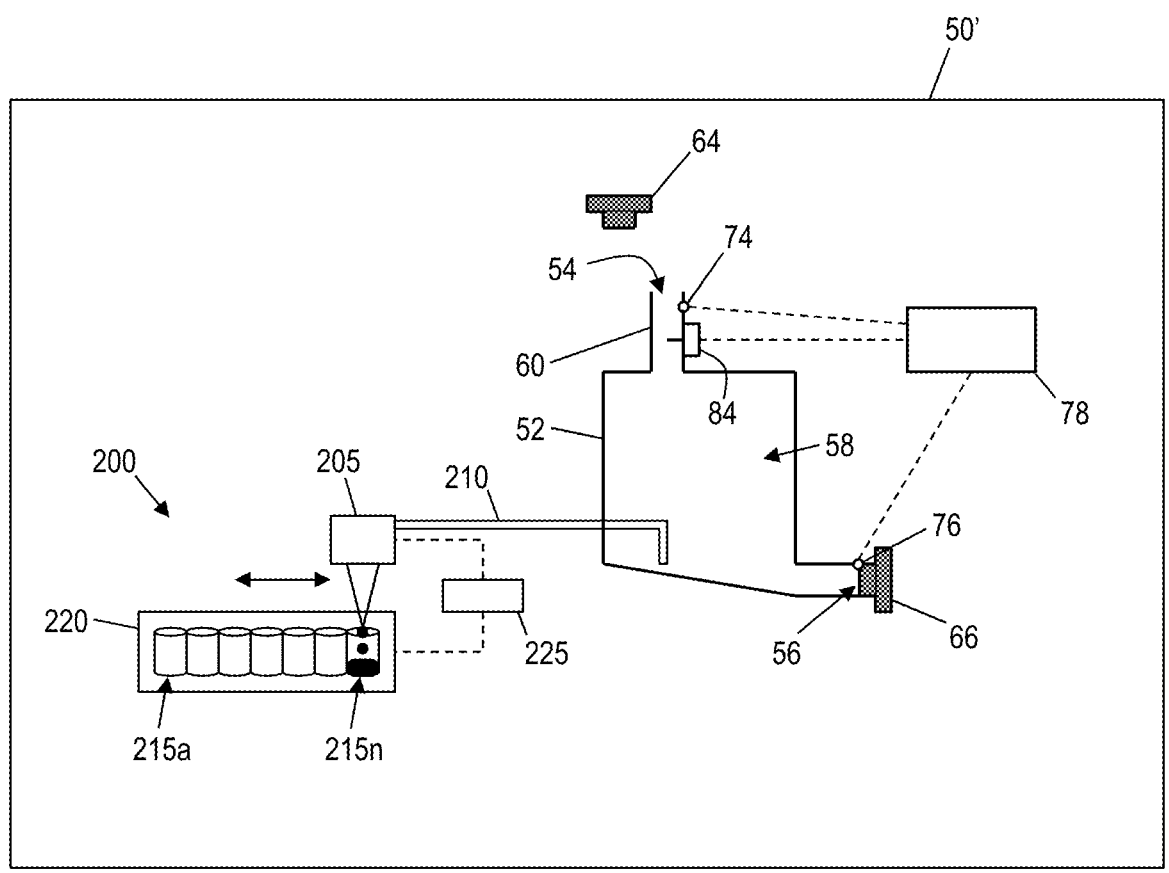
FIG. 5 shows a block diagram of a system in accordance with aspects of the invention.

FIG. 5 shows another embodiment of a vehicle 50' in accordance with aspects of the invention. As illustrated in FIG. 5, the vehicle 50' includes a fluid reservoir 52 having an inlet port 54, outlet port 56, internal cavity 58, fill neck 60, inlet cap 64, drain plug 66, cap sensor 74, plug sensor 76, and fill sensor 84, all of which may be similar to those elements described with respect to FIG. 2.

In accordance with aspects of the invention, the vehicle 50' includes a sample system 200 for collecting samples of fluid from the fluid reservoir. In embodiments, the system 200 is installed in the vehicle 50' and includes a dispenser 205 that is fluidically connected to the internal cavity 58 of the fluid reservoir via plumbing 210. The system 200 also includes a plurality of sample containers 215*a-n* arranged in a removable unit 220. The system also includes a positioning mechanism 225 configured to move the dispenser 205 relative to the sample containers 215*a-n*.

According to aspects of the invention, based on determining that fluid is being added to the fluid reservoir 52, the system 200 collects a sample of the fluid from the internal cavity 58 and deposits the sample in one of the sample containers 215*a-n*. The system 200 repeats this process each time fluid is added to the fluid reservoir 52, storing each different sample in a different one of the sample containers 215*a-n*. In this manner, a record of the fluid that was added to the fluid reservoir at each fluid change is preserved in the sample containers 215*a-n*.

The number 'n' of sample containers 215*a-n* can be any number, such as between thirty and fifty, e.g., a sufficient number to cover the typical number of oil changes over the life of the vehicle 50'. Each one of the sample containers 215*a-n* can be very small in size, e.g., just large enough to hold a few drops of the fluid. The sample containers 215*a-n* may be housed in a removable unit 220 that can be removed from the vehicle 50' to access the fluid samples stored in the sample containers 215*a-n*. In this manner, a prospective buyer of the vehicle 50' may take the removable unit 220 from the vehicle 50' to have the fluid sample analyzed. This will provide the prospective buyer the ability to determine what type of fluid was used at each fluid change. Additionally, a service can be made available to verify the accuracy of the fluid changes that get tagged and tracked with the vehicle 50'.

In accordance with aspects of the invention, the computer device 78 causes the system 200 to obtain a sample based on determining that fluid is being added to the fluid reservoir 52. For example, based on data from the cap sensor 74 and data from the fill sensor 84, the computer device 78 determines that the inlet cap 64 is removed and that fluid is being added to the fluid reservoir 52. Upon determining that the inlet cap 64 is removed and that fluid is being added to the fluid reservoir 52, the computer device 78 controls the dispenser 205 to obtain a sample of the fluid from the internal cavity 58. The dispenser 205 may include a pump that is controlled by the computer device 78 and that is configured to extract a sample of fluid from the internal cavity 58 via the plumbing 210. The computer device 78 may also be configured to control the positioning mechanism 225 to align an outlet of the dispenser 205 with an inlet of a next empty one of the sample containers 215*a-n*. The positioning mechanism 225 may comprise any suitable system (e.g., such as a drive and gear system) for moving the dispenser 205 relative to the sample containers 215*a-n*, or alternatively moving the sample containers 215*a-n* relative to the dispenser 205. The computer device 78 may be configured to track the position of the dispenser 205 relative to the sample containers 215*a-n*, such that the computer device has a record of which one of the sample containers 215*a-n* is filled on a particular date.

Figure 6:
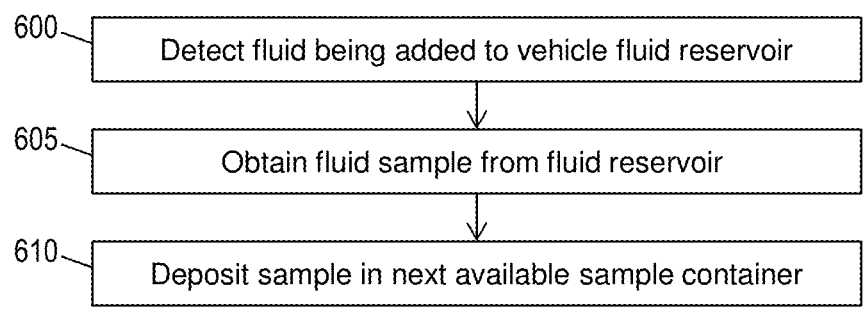
FIG. 6 shows a flowchart of an exemplary method in accordance with aspects of the invention.

FIG. 6 shows a flowchart of a method in accordance with aspects of the invention. Steps of the method of FIG. 6 may be performed in the system illustrated in FIG. 5 and are described with reference to elements and steps described with respect to FIG. 5.

At step 600, the system detects that fluid is being added to the fluid reservoir 52 of the vehicle 50'. In embodiments, as described with respect to FIG. 5, the computer device 78 determines that fluid is being added based on data from the cap sensor 74 and the fill sensor 84.

At step 605, the system obtains a sample of the fluid from the fluid reservoir 52. In embodiments, as described with respect to FIG. 5, the computer device 78 causes the dispenser 205 to pump a small amount of fluid out of the fluid reservoir 52 via the plumbing 210.

At step 610, the system deposits the sample in a next available one of the sample containers 215*a-n*. In embodiments, as described with respect to FIG. 5, the computer device 78 controls the positioning mechanism to align the outlet of the dispenser 205 with the inlet of a next empty one of the sample containers 215*a-n*. When the two are aligned, the computer device 78 causes the dispenser 205 to expel the sample into the respective one of the sample containers 215*a-n*. In embodiments, the computer device 78 maintains a record of the respective date the fluid sample was added to respective ones of the sample containers 215*a-n*. In this manner, when the fluid samples are later analyzed, the each one of the sample containers 215*a-n* is tagged with a date of its respective fluid sample.

In this manner, an aspect of the invention is directed to a method of maintaining a fluid in a mechanical apparatus, comprising the steps of: providing a plurality of fluid containers in a mechanical apparatus; determining when a filler cap for said fluid is removed and upon new fluid entering said filler, placing a sample quantity of said new fluid into one of said fluid containers; analyzing said fluid and storing results of said analysis in a cloud storage; and determining whether said results match expected values for said new fluid, and if not, flagging said fluid filling as an anomaly.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for capturing fluid change history in a vehicle, comprising:
    determining fluid is being added to a fluid reservoir in the vehicle via an inlet port of the fluid reservoir, wherein the fluid reservoir comprises the inlet port, an outlet port, an internal cavity, an inlet cap, a drain plug, a cap sensor, and a fill sensor; and
    based on the determining, collecting a sample of the fluid from the internal cavity and depositing the sample in one of a plurality of sample containers of a sample system,
    wherein the sample system comprises a dispenser that is fluidically connected to the internal cavity of the fluid reservoir via plumbing, respective ones of the plurality of sample containers are configured to receive one of the sample of fluids from the dispenser, and the dispenser and the plurality of sample containers are in the vehicle.

2. The method of claim 1, wherein the determining is performed based on data from the cap sensor and data from the fill sensor.

3. The method of claim 1, further comprising controlling a positioning mechanism to align the dispenser with an empty one of the plurality of sample containers.

4. The method of claim 3, wherein the positioning mechanism is configured to move the dispenser relative to the plurality of sample containers.

5. The method of claim 3, wherein the positioning mechanism is configured to move the plurality of sample containers relative to the dispenser.

6. The method of claim 1, further comprising storing data defining a respective date that one of the fluid samples was dispensed into a respective one of the plurality of sample containers.

7. The method of claim 1, wherein the plurality of sample containers are arranged in a unit that is removable from the vehicle.

8. The method of claim 1, wherein the dispenser includes a pump.

9. The method of claim 8, wherein the pump is configured to extract the sample from the internal cavity.

10. The method of claim 1, wherein each of the plurality of sample containers is configured to hold a few drops of the fluid.

11. A computer program product for capturing fluid change history in a vehicle, the computer program product comprising a computer readable storage medium having program instructions embodied therewith, the program instructions executable by a computer device to cause the computer device to:
    determine fluid is being added to a fluid reservoir in the vehicle via an inlet port of the fluid reservoir, wherein the fluid reservoir comprises the inlet port, an outlet port, an internal cavity, an inlet cap, a drain plug, a cap sensor, and a fill sensor; and
    based on the determining, collect a sample of the fluid from the internal cavity and depositing the sample in one of a plurality of sample containers of a sample system,
    wherein the sample system comprises a dispenser that is fluidically connected to the internal cavity of the fluid reservoir via plumbing, respective ones of the plurality of sample containers are configured to receive one of the sample of fluids from the dispenser, and the dispenser and the plurality of sample containers are in the vehicle.

12. The computer program product of claim 11, wherein the determining is performed based on data from the cap sensor and data from the fill sensor.

13. The computer program product of claim 11, wherein the program instructions cause the computer device to control a positioning mechanism to align the dispenser with an empty one of the plurality of sample containers.

14. The computer program product of claim 13, wherein the positioning mechanism is configured to move the dispenser relative to the plurality of sample containers.

15. The computer program product of claim 13, wherein the positioning mechanism is configured to move the plurality of sample containers relative to the dispenser.

16. The computer program product of claim 11, wherein the program instructions cause the computer device to store data defining a respective date that one of the fluid samples was dispensed into a respective one of the plurality of sample containers.

17. The computer program product of claim 11, wherein the plurality of sample containers are arranged in a unit that is removable from the vehicle.

18. The computer program product of claim 11, wherein the dispenser includes a pump.

19. The computer program product of claim 18, wherein the pump is configured to extract the sample from the internal cavity.

20. The computer program product of claim 11, wherein each of the plurality of sample containers is configured to hold a few drops of the fluid.

\* \* \* \* \*